(12) United States Patent
Reichow et al.

(10) Patent No.: US 7,506,538 B2
(45) Date of Patent: Mar. 24, 2009

(54) SUSPENSION SYSTEM WITH NEUTRAL AXIS WEIGH SYSTEM

(75) Inventors: Keith Reichow, Kent, WA (US); Bill Zimmerman, Seattle, WA (US)

(73) Assignee: Stress Tek, Inc., Kent, WA (US)

( * ) Notice: Subject to any disclaimer, the term of this patent is extended or adjusted under 35 U.S.C. 154(b) by 0 days.

(21) Appl. No.: 11/396,333

(22) Filed: Mar. 31, 2006

(65) Prior Publication Data

US 2007/0062738 A1    Mar. 22, 2007

Related U.S. Application Data

(60) Provisional application No. 60/667,628, filed on Mar. 31, 2005.

(51) Int. Cl.
*G01M 17/04* (2006.01)

(52) U.S. Cl. .................................. 73/117.03

(58) Field of Classification Search .............. 73/115.01, 73/115.07, 117.01, 117.02, 117.03, 862.041, 73/862.042, 862.043, 862.044, 862.045
See application file for complete search history.

(56) References Cited

U.S. PATENT DOCUMENTS

| | | | | |
|---|---|---|---|---|
| 4,042,049 A | * | 8/1977 | Reichow et al. | 177/137 |
| 4,102,031 A | * | 7/1978 | Reichow et al. | 20/464 |
| RE35,301 E | * | 7/1996 | Reichow | 177/136 |
| 5,681,998 A | * | 10/1997 | Nakazaki et al. | 73/118.1 |
| 6,116,096 A | * | 9/2000 | Takahashi et al. | 73/862.621 |
| 6,118,083 A | * | 9/2000 | Boyovich et al. | 177/136 |

\* cited by examiner

*Primary Examiner*—Eric S McCall
(74) *Attorney, Agent, or Firm*—Perkins Coie LLP (57) ABSTRACT

One aspect of the invention is directed to a suspension and weigh system for use with a vehicle having weight bearing members. The system has a support connectable to the weight bearing members of the vehicle. The support has a length and a neutral axis along at least a portion of the length. A weigh system is coupled to the support and configured to measure and/or determine weight carried by the weight bearing members. The weigh system has a load sensor attached to the support and positioned substantially adjacent to the neutral axis. A data processor is coupled to the load sensor and configured to receive the output signal from the load sensor for determining the weight carried by the axles. In one embodiment, a display is coupled to the data processor and configured to display data related to the weight carried by the axles.

17 Claims, 9 Drawing Sheets

Fig. 11

SUSPENSION SYSTEM WITH NEUTRAL AXIS WEIGH SYSTEM

CROSS REFERENCE TO RELATED APPLICATION

This application is a non-provisional patent application that hereby claims priority to U.S. Provisional Patent Application Ser. No. 60/667,628, entitled Suspension System with Neutral Axis Weigh System, filed Mar. 31, 2005, which is hereby incorporated herein in its entirety by reference thereto.

TECHNICAL FIELD

The present invention is directed to vehicle suspension systems with load detection assemblies, and more particularly to suspensions with equalizing beams and weigh systems connected thereto, and related methods.

BACKGROUND

Weight regulations limiting the loaded weights of commercial vehicles are almost universally in effect. These regulations generally specify the maximum load of each vehicle axle as well as the maximum total load. Fines are usually levied against operators who are found violating these regulations. To maximize profits, vehicle operators normally load their vehicles as close as possible to the legal load limit. In order to do this, the vehicle operator must be able to accurately measure the vehicle's weight while the vehicle is being loaded.

On-board vehicle weighing systems have been developed to accurately measure the vehicle's weight, including while the vehicle is being loaded. In these on-board weighing systems, strain gauge-based sensors are generally secured to structural members of the vehicle, usually the axles. However, conventional strain gauges placed on tandem axles to measure loading experienced significant accuracy problems.

Other on-board load measuring systems utilize load cells placed on structural members between the axles and the load. However, these systems also have shortcomings. While these systems can be highly accurate, they typically are more expensive. In addition, they are difficult to retrofit on existing vehicles and cannot sense the extra weight added to a vehicle by dirt and other debris collected on the surfaces of the vehicle suspension beneath the load cells.

Other on-board load measuring systems measure the relative displacement of the springs or the relative displacement between the vehicle frame and axle. However, the accuracy of these devices is adversely affected by wear, friction and debris.

SUMMARY

The present invention is directed to vehicle suspension systems with equalizing beams and weigh systems connected thereto and associated methods. One aspect of the invention is directed to a suspension and weigh system for use with a vehicle having weight bearing members. The system has a support connectable to the weight bearing members of the vehicle. The support has a length and a neutral axis along at least a portion of the length. A weigh system is coupled to the support and configured to measure and/or determine weight carried by the weight bearing members. The weigh system has a load sensor attached to the support and positioned substantially adjacent to the neutral axis to detect a deflection in the support and to provide an output signal related to at least one of the deflection and the weight. A data processor is coupled to the load sensor and configured to receive the output signal from the load sensor for determining the weight carried by the axles. In one embodiment, a display is coupled to the data processor and configured to display data related to the weight carried by the axles.

DETAILED DESCRIPTION

Embodiments of the present invention are directed to vehicle suspension systems having equalizing beams with a boxed beam or fabricated beam construction. One or more load sensor assemblies are connected to the beams substantially along the neutral axis of the beams, so the load sensor assemblies maintain accuracy but do not adversely affect the strength or fatigue life of the equalizing beams. Embodiments are also directed to methods associated with suspension systems and load sensor assemblies. Several specific details of the invention are set forth in the following description, FIGS. 1-11, and Appendix A to provide a thorough understanding of certain embodiments of the invention. One skilled in the art, however, will understand that the present invention may have additional embodiments, and that other embodiments of the invention may be practiced without several of the specific features described below.

Figure 1:
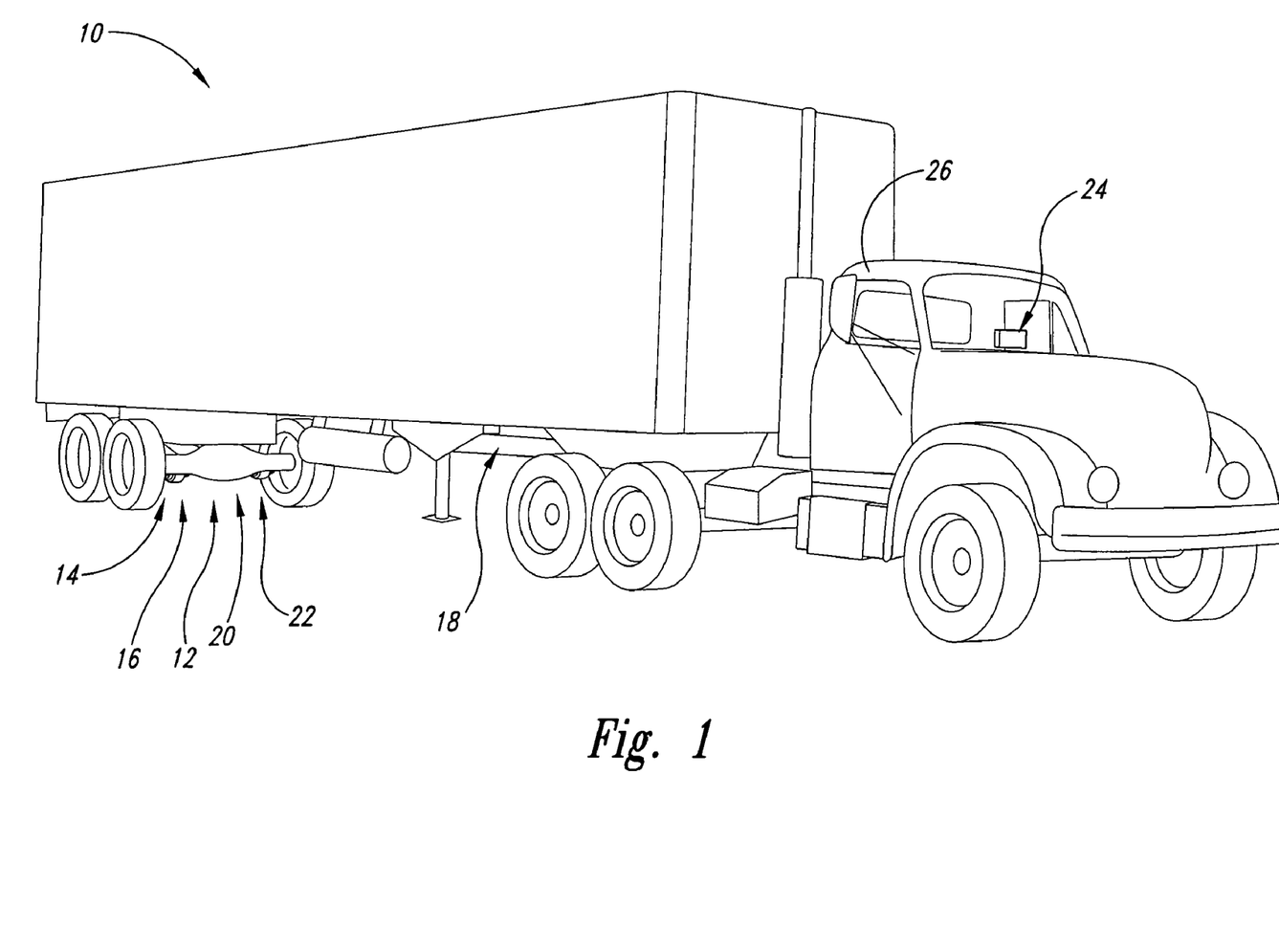
FIG. 1 is an isometric view of a vehicle having tandem rear axles with a suspension system and weigh system in accordance with an embodiment of the present invention.

FIG. 1 is an isometric view of a vehicle 10, such as a truck, having a rear suspension system 12 with tandem rear axles 14. A weigh system 16 is coupled to the suspension system 12 in accordance with an embodiment of the present invention. The illustrated vehicle 10 is a long-haul truck having a suspension system 12 with equalizing beams, also known as equalizing beams 20. The suspension system 12 couples the tandem rear axles 14 to a conventional frame 18. The weigh system 16 in accordance with an embodiment is connected to the suspension system 12 and includes a data processing unit 22 coupled to a weight display meter 24 or other display unit in the cab of the vehicle 10. The weigh system 16 measures weight carried by the truck's rear tandem axles 14. The rear axle group weight is constantly monitored and displayed on the meter 24. Accordingly, the driver can be constantly alerted to the weight conditions on the rear axles 14, so payload can be adjusted or unloaded from the vehicle 10 before an overweight condition occurs.

Figure 2:
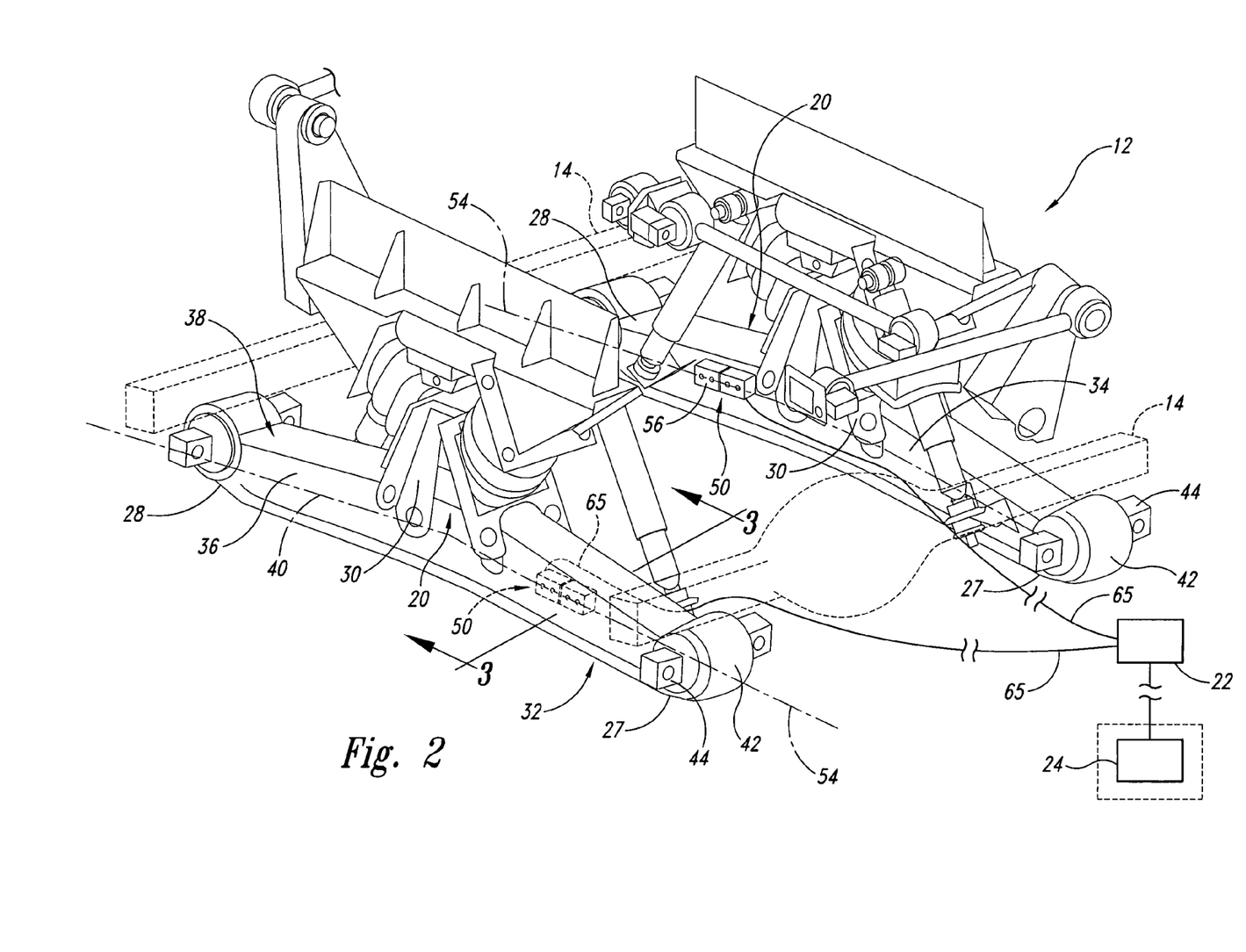
FIG. 2 is an enlarged isometric view of the suspension system and weigh system of an embodiment of the present invention shown removed from the vehicle.

FIG. 2 is an enlarged isometric view of the suspension system 12 and the weigh system 16 shown removed from the vehicle 10 (FIG. 1). The suspension system 12 of the illustrated embodiment includes a pair of spaced apart equalizing beams 20 having fore and aft ends 27 and 28 coupled to the rear axles 14. Each equalizing beam 20 has a welded, boxed beam construction. In one embodiment, the suspension system 12 can be manufactured by Hendrickson Truck Suspension Systems (a Boler Company) of Woodridge, Ill. The equalizing beams 20 can be from the Hendrickson HN Series suspension system.

Each equalizing beam 20 has a side profile generally in the shape of a very shallow and inverted V. A mounting assembly, known as a saddle 30, is secured to the top of the equalizing beam 20 between the fore and aft ends 27 and 28 substantially at the apex of the beam. The saddle 30 of the illustrated embodiment is welded to the equalizing beam 20 and is configured to connect to springs and/or dampers in a conventional manner.

Figure 3:
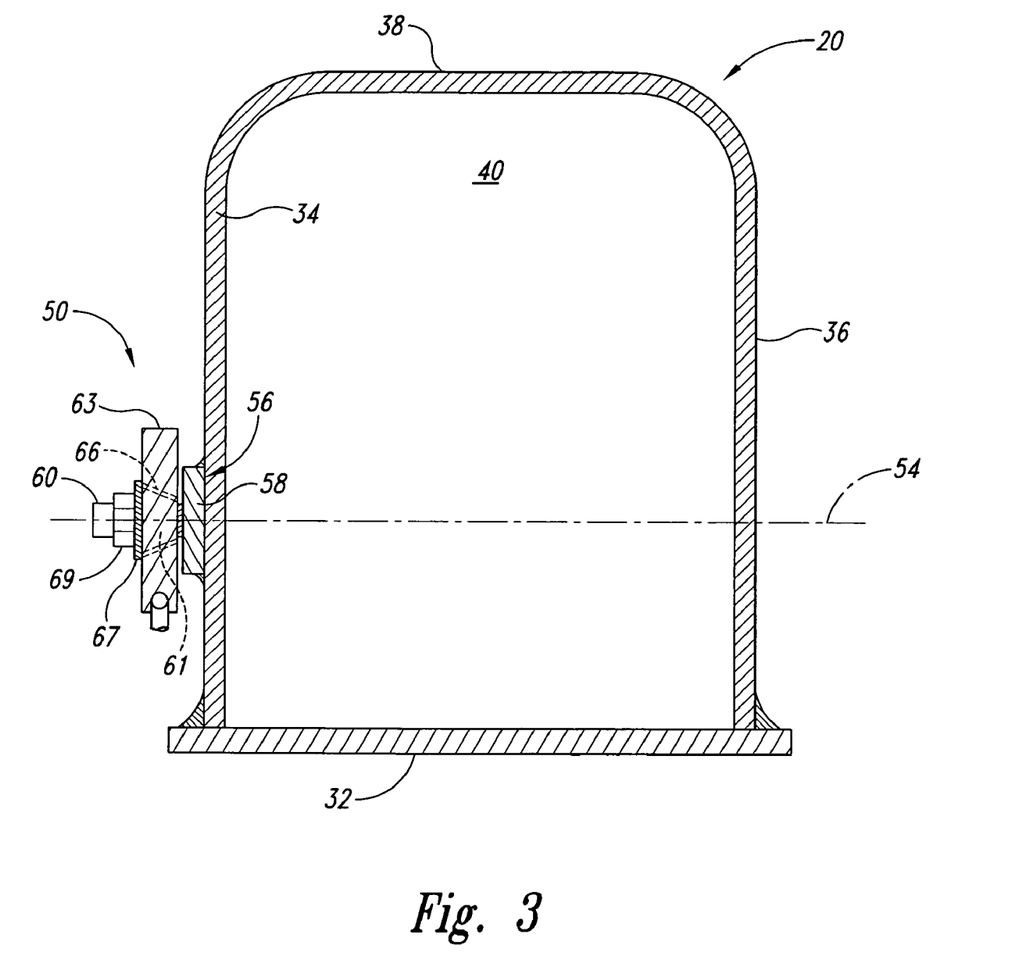
FIG. 3 is an enlarged cross sectional view taken substantially along line 3-3 of FIG. 2 showing a fabricated equalizing beam.

FIG. 3 is an enlarged cross sectional view of the equalizing beam 20 taken substantially along lines 3-3 of FIG. 2. The equalizing beam 20 has a base 32 connected to inboard and outboard sidewalls 34 and 36. A top wall 38 extends between and is integrally connected to upper portions of the inboard and outboard sidewalls 34 and 36. Accordingly, the equalizing beam 20 has a hollow interior area 40 between the inboard and outboard sidewalls 34 and 36.

The fore and aft ends 27 and 28 of the equalizing beam 20 are welded to bushing tubes 42 that include bar pin axle connections 44. The bushing tubes 42 and bar pin axle connections 44 are connected to the rear axles 14 by conventional brackets (not shown). Accordingly, forces are transmitted to the equalizing beam 20 at the fore and aft ends 27 and 28 via the bushing tubes 42 and at the beam's apex portion through the saddle 30. The equalizing beam 20, when subjected to these forces, will flex and deflect a slight amount, thereby creating compression forces along the top wall 38 and tensile forces along the base 32. The inboard and outboard sidewalls 34 and 36 are also subjected to longitudinal stresses when the equalizing beam 20 is flexed. The upper portions of the inboard and outboard sidewalls 34 and 36 are subjected to compression forces, and the lower portions of the sidewalls are subjected to tensile forces.

The equalizing beam 20 has a neutral axis 44 along the beam's length that does not experience compression or tensile forces when the equalizing beam is flexed. Accordingly, the longitudinal strain in the equalizing beam 20 along the neutral axis 44 is substantially zero when bending forces are exerted on the beam. The area immediately adjacent to the neutral axis magnitude of the longitudinal strains are minimal and the magnitude of the strains increases as the distance from the neutral axis increases toward the top panel 38 or base 32.

Figure 4:
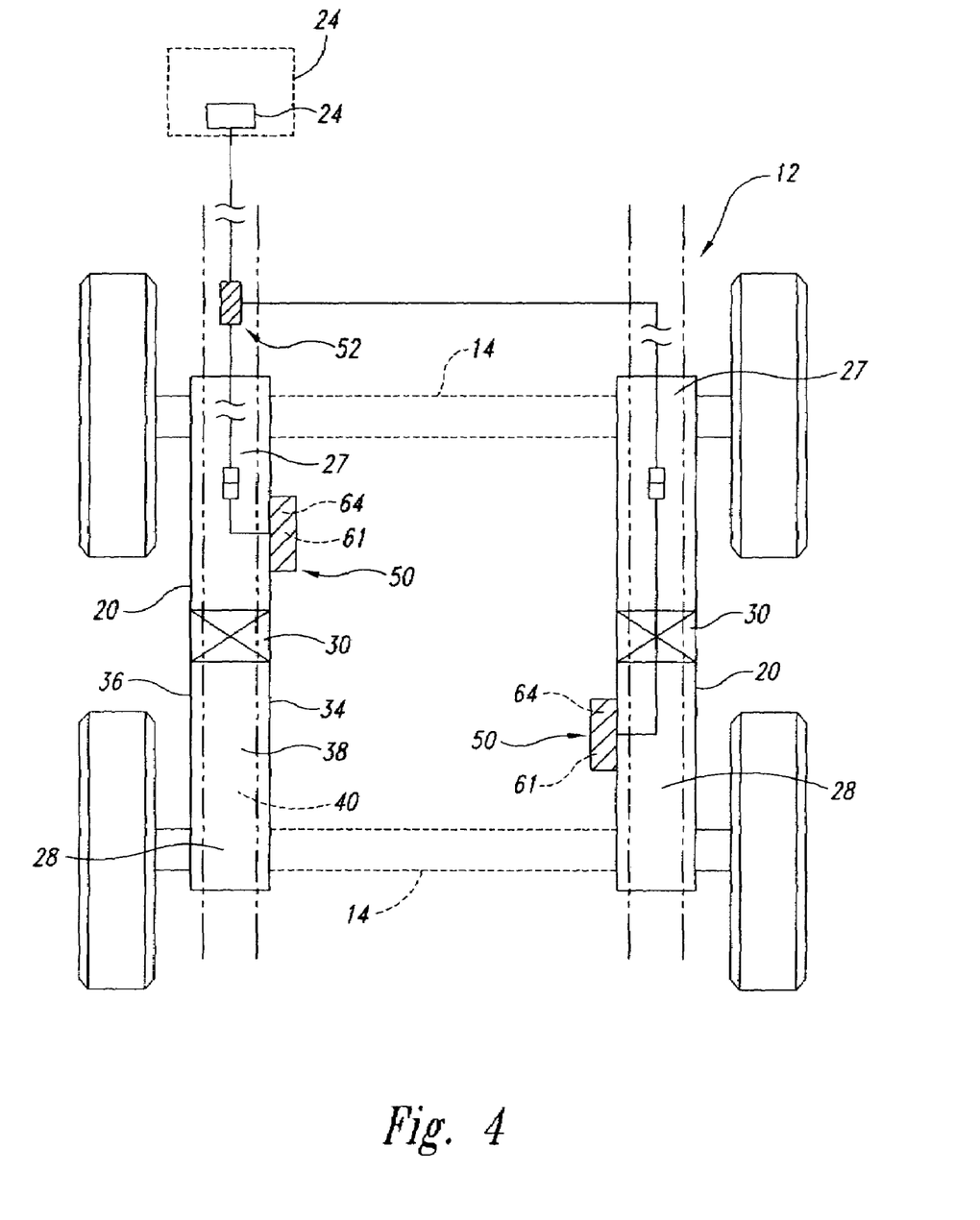
FIG. 4 is a schematic plan view of the tandem rear axles and suspension system with the weigh system of FIG. 1.

FIG. 4 is a schematic plan view of the tandem rear axles 14, the suspension system 12, and the weigh system 16 of an embodiment of the invention. As best seen in FIGS. 3 and 4, the weigh system 16 includes a sensor assembly 50 mounted to the inboard sidewall 34 of each equalizing beam 20. Each sensor assembly 50 is configured to detect the deflection in the equalizing beam 20 caused by the load carried by the equalizing beam. The sensor assembly 50 is also configured to provide an output signal that can be used by the display unit or data processing unit to determine the weight, such as when the vehicle is being loaded. In the illustrated embodiment, two sensor assemblies 50 are connected to the equalizing beams 20. One load sensor assembly 50 is mounted on the inboard sidewall 34 of one equalizing beam 20 toward the fore end 27, and the other load sensor assembly is mounted on the inboard sidewall of the other equalizing beam toward the aft end 28.

The load sensor assemblies 50 are operatively connected to a data processing unit 52 that receives information from the strain gauges in the load sensors. The data processing unit 52 can be mounted near the load sensor assemblies 50, such as on the inside of the truck frame rail or next to another structural member. The data processing unit 52 should be installed in an area protected from road and hauling debris. The data processing unit 52 of one embodiment is the VSL Vulcoder manufactured by Stress-Tek of Kent, Wash. Other embodiments can use other data processing units, including onboard computer systems.

The data processing unit 52 of the illustrated embodiment is connected to the meter 24 in the vehicle's cab 26 (FIG. 1). The data processing unit 52 is configured to, inter alia, calculate the weight of the load in the vehicle based upon data input from the load sensor assemblies 50, and to provide the weight information to the meter 24. The meter 24 is coupled to the vehicle's electrical system and runs off of the vehicle's batteries or other 12-24V power source. Accordingly, the operator of the vehicle 10 can easily see and monitor the load on the vehicle from within the cab.

Figure 5:
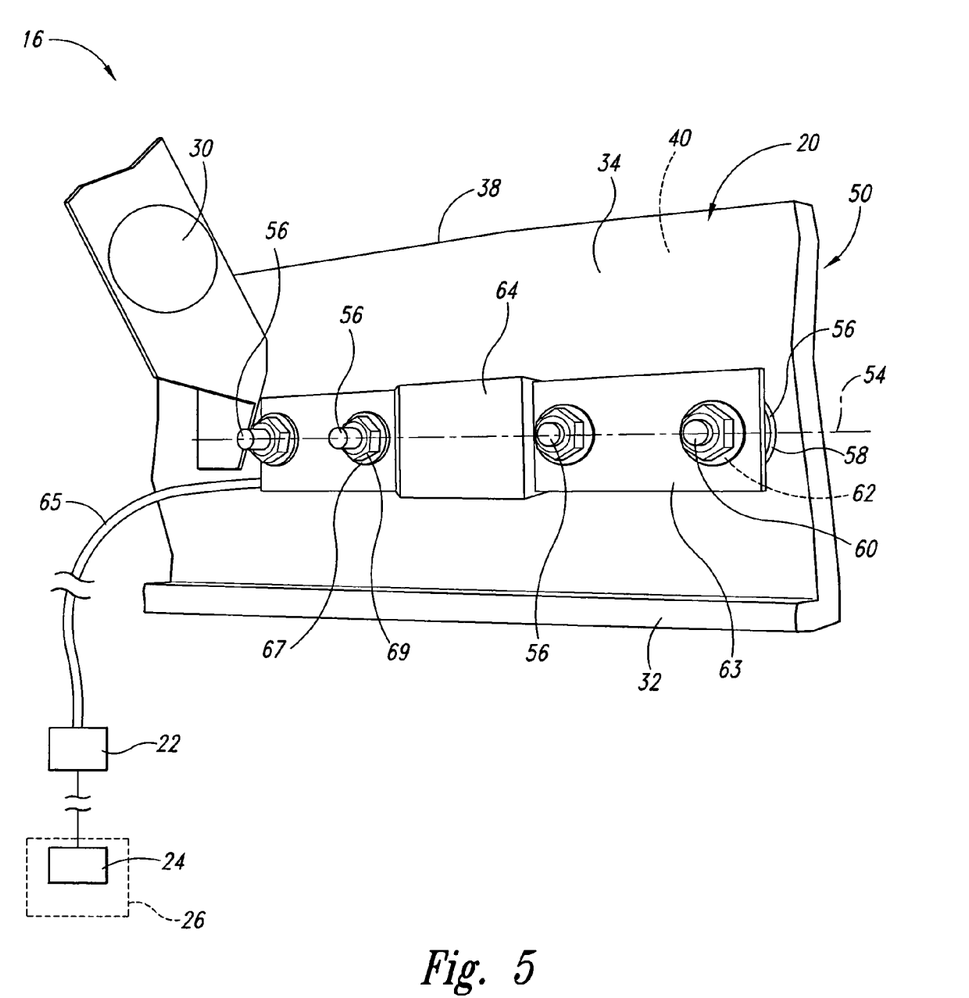
FIG. 5 is an isometric view of a neutral axis load sensor assembly of the weigh system installed on the equalizing beam along the beam's neutral axis.
Figure 6A:
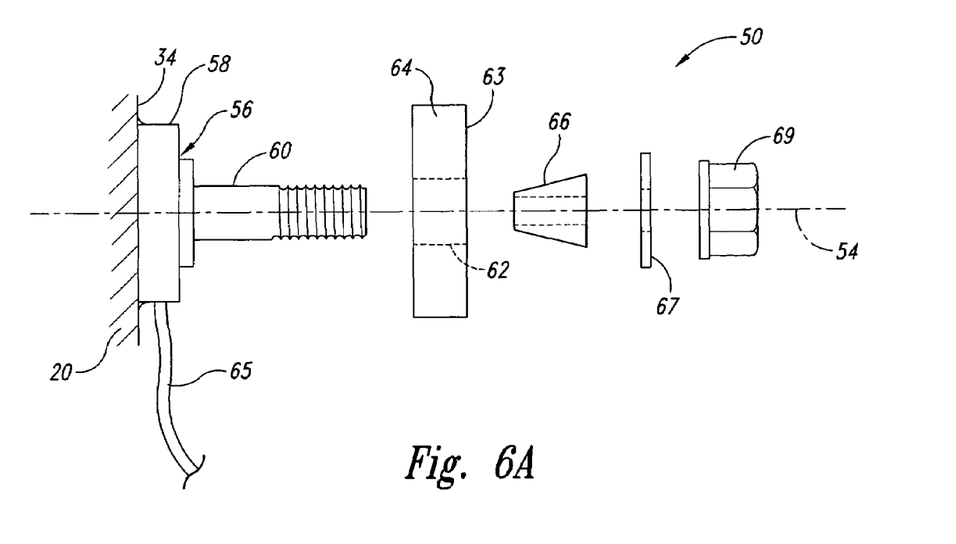
FIG. 6A is a schematic, exploded side elevation view of the load sensor assembly mounted to the inboard sidewall of the equalizing beam.

FIG. 5 is an enlarged isometric view of a load sensor 64 mounted on the inboard sidewall 34 of the equalizing beam's 20. The load sensor 64 is mounted along the neutral axis 54 of the equalizing beam 20. FIG. 6A is a schematic exploded side elevation view of the load sensor 64 mounted to the beam's inboard sidewall 34. The load sensor assembly 50 includes four mounting studs 56 securely mounted to the inboard sidewall 34 substantially along the beam's neutral axis 54. In the illustrated embodiment, each mounting stud 56 has an enlarged head 58 welded to the inboard sidewall 34 substantially along the beam's neutral axis 54 and adjacent areas where the longitudinal strains are minimal. The mounting stud 56 has a threaded shaft 60 extending from the head 58 and is also positioned substantially in alignment with the beam's neutral axis 54.

Figure 6B:
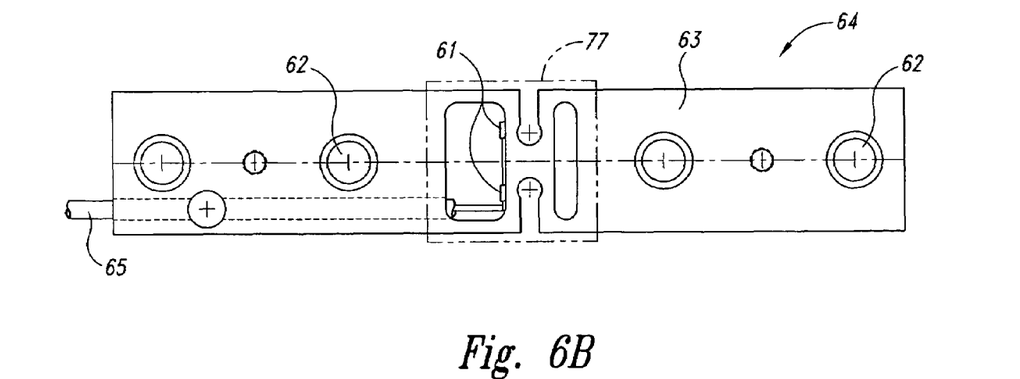
FIG. 6B is an enlarged side elevation view of a load sensor of one embodiment shown removed from the equalizing beam.

The load sensor assembly 50 also includes the load sensor 64 that mounts onto the threaded shafts 60 of the mounting studs 56. The load sensor 64 includes four mounting apertures 62 that receive the threaded shafts 60. As best seen in FIG. 6B, each load sensor 64 includes one or more strain gauges 61 on which forces will be applied when the load sensor 64 is subjected to bending loads from the equalizing beam 20. Accordingly, as load is added or removed from the vehicle 10 (FIG. 1), the equalizing beams 20 flex a slight amount under the induced stress. The load sensors 64 mounted to the equalizing beams deflect slightly, thereby sending an electrical signal from the strain gauges 61 to the data processing unit 52, which provides weight information to the meter 24 in the cab 26 (FIG. 1). The strength of the electrical signal from the strain gauges 61 is used to determine the amount of the sensor deflection along the neutral axis 54. The load sensor assembly 50 is calibrated and configured to accurately determine the load applied to the equalizing beam 20 upon the sensor deflection.

The load sensor 64 includes a sensor body 63 that carries the strain gauges 61 and a protective coating 77 around strain gauges and the middle portion of the sensor body. A signal cable 65 extends through a lower portion of the sensor body 63 and is connected to the strain gauges 61. The signal cable 65 is connected at the other end to the data processing unit 52 to provide electrical signals thereto from the strain gauges 61. When the load sensor 64 is installed, it is positioned so the signal cable 65 extends toward the center of the equalizing beam 20.

The load sensor 64 is securely retained on the four mounting studs 56 by installing a tapered bushing 66, a flat washer 67 and a locking nut 69 onto the threaded shaft 60. The nut 69 captures the washer 67 and the tapered bushing 66 against the load sensor 64 to fixedly hold the load sensor on the mounting studs 60 during operation of the vehicle 10 (FIG. 1) over the life of the load sensor assembly 50. This secure mounting of the load sensor 64, which allows for substantially no relative movement between the sensor body 63 and the mounting stud 56, is required to maintain the accuracy of the load data provided to the data processing unit 52 and the meter 24 (FIG. 4). Mounting the load sensor 64 substantially along the neutral axis 54 and surrounding areas where the longitudinal strains allows the strain gauges 61 to accurately detect the beam's deflection without adversely effecting the strength or fatigue life of the equalizing beam.

Before the load sensor assembly 50 can be properly mounted to the inboard sidewall 34 of the equalizing beam 20, the location of the beam's neutral axis 54 must be determined. The equalizing beam 20 and associated components define a relatively complex three dimensional shape. The beam's shape and the attached components affect the beam's deflection pattern, thereby affecting the location of the beam's neutral axis 54. In one embodiment, the location of the neutral axis may be determined using a conventional computerized solid modeling program. In another embodiment, the neutral axis's location is determined visually with the use of photoelastic material that can be attached to portions of the equalizing beam 20.

Figure 7:
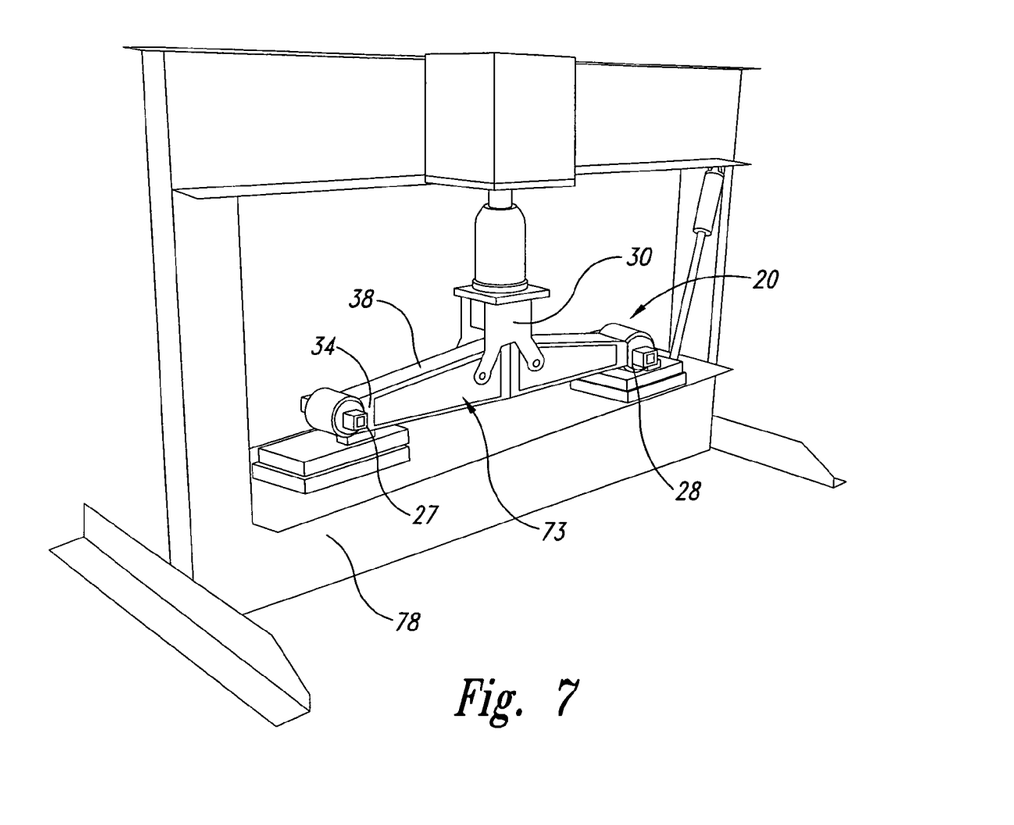
FIG. 7 is an isometric view of an equalizing beam mounted in a jig for use in determining the location of the beam's neutral axis.

In one embodiment, the neutral axis 54 of the equalizing beam 20 is visually located by securely attaching a thin coating 73 of photoelastic material, such as a photoelastic plastic layer, to the beam's inboard sidewall 34. The equalizing beam 20 is then deflected in a controlled environment. In one embodiment as shown in FIG. 7, equalizing beam 20 is installed in a test FIG. 78 that holds the fore and aft ends 27 and 28 in a fixed position. A load is then applied by the test FIG. 78 to the saddle 30 so as to cause some deflection within the equalizing beam 20. A corresponding deflection occurs in the photoelastic coating, thereby causing compression and tension forces in the coating that positionally correspond to the compression and tension forces in the inboard sidewall 34 of the equalizing beam 20 during the deflection.

Figure 8:
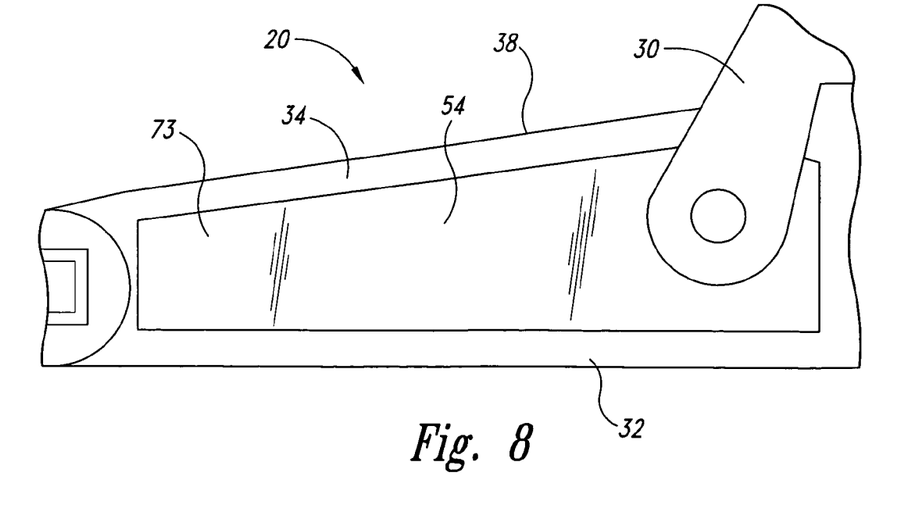
FIG. 8 is a side elevation view of a portion of the equalizing beam with a photoelastic coating installed, under load, and illuminated with polarized light to show the location of the neutral axis.

The optical characteristics of the photoelastic coating 73 change when subjected to compression or tension forces. While the equalizing beam 20 with the photoelastic coating 73 thereon is under load, a polarized light is used to illuminate the photoelastic coating. The areas of compression and tension in the illuminated photoelastic coating 73 can be seen as differing colors depending upon the magnitude of the longitudinal stress exerted on the photoelastic coating. The location of the neutral axis 54 of the equalizing beam 20 can also be clearly seen in the photoelastic coating 73 as the transition area between the compression and tension forces in the photoelastic coating. Therefore, the location of the equalizing beam's neutral axis 54 can be easily identified visually. After the neutral axis 54 is identified, the location for attaching the mounting stud 56 along the neutral axis can be selected.

Figure 9:
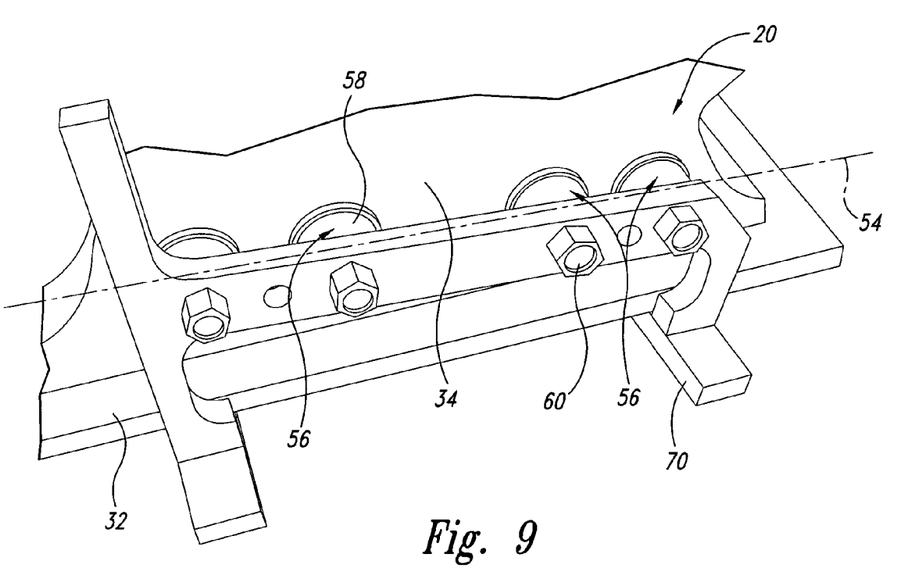
FIG. 9 is an isometric view of the equalizing beam with mounting studs retained in stud jig that positions the mounting studs along the neutral axis.

In one embodiment shown in FIG. 9, the mounting studs 56 can be properly installed on the equalizing beam 20 substantially along the neutral axis 54 (once determined) by using a stud jig 70. The stud jig 70 is shaped and sized to hold the mounting studs 56 adjacent to the equalizing beam's inboard sidewall 34 (without the photoelastic coating installed) substantially along the neutral axis 54. The mounting studs 56 can then be easily and accurately welded onto the inboard sidewall 34 along the neutral axis 54 while held by the stud jig 70. After the mounting studs 56 are welded or otherwise fixed in place, the stud jig 70 is removed and the load sensor 64 can be installed on the mounting studs and secured in place, as described above.

Figure 10:
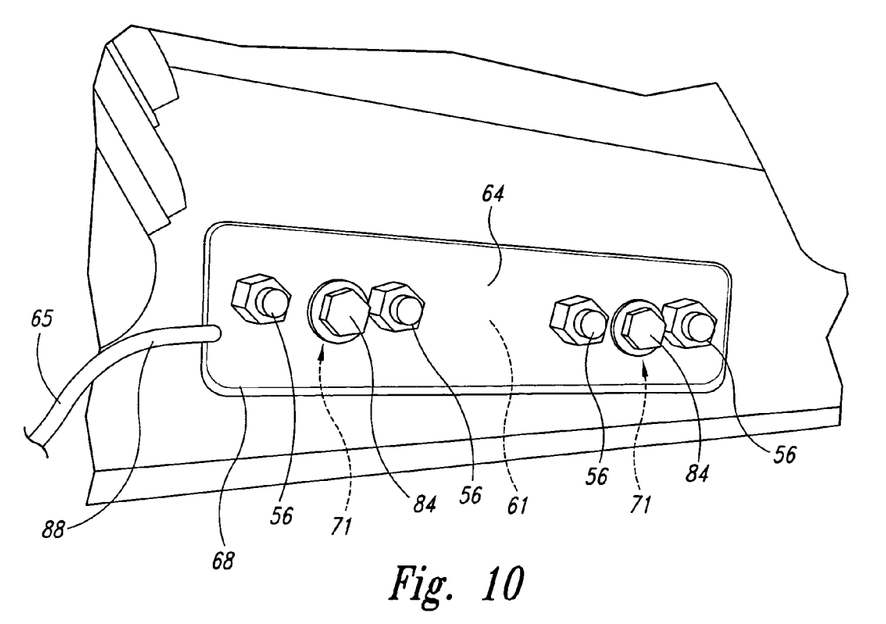
FIG. 10 is a side elevation view of the load sensor assembly mounted along the neutral axis of the equalizing beam with a cover installed over the load sensor.
Figure 11:
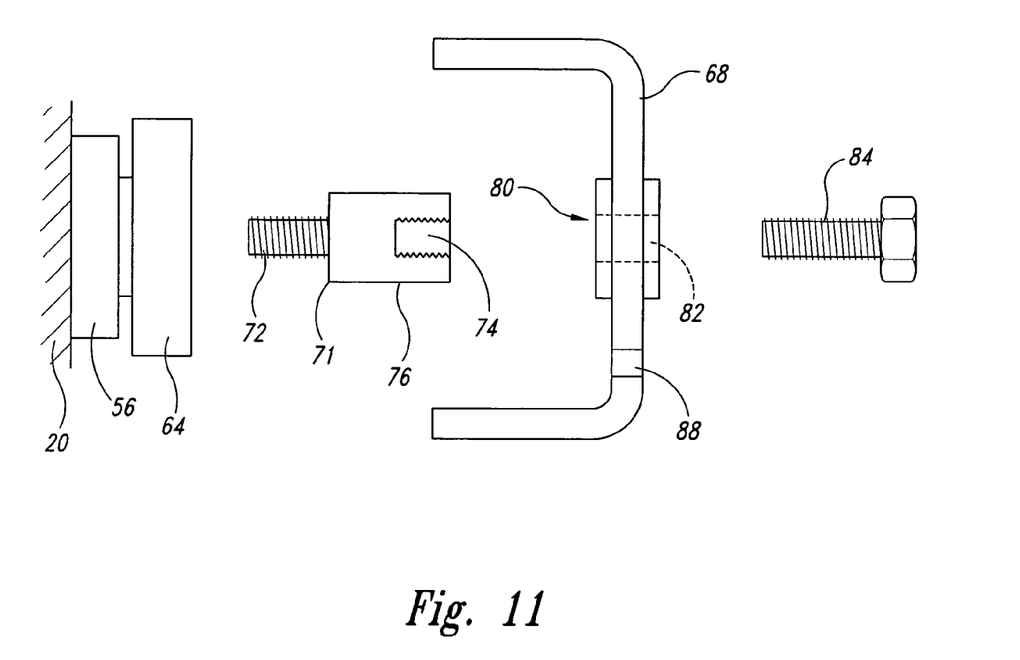
FIG. 11 is a schematic, exploded cross-sectional view taken substantially along lines 11-11 of FIG. 10 showing the load sensor with the cover.

FIG. 10 in as a side elevation view of the load sensor assembly 50 mounted substantially along the neutral axis of the equalizing beam 20 with a cover 68 installed over the load sensor 64. FIG. 11 is a schematic, partially exploded cross-sectional view of the load sensor assembly 50 taken substantially all long line 11-11 of FIG. 10. The cover 68 to substantially encloses and protects the load sensor 64. In the illustrated embodiment, the cover 68 is mounted to the load sensor 64 with a pair standoff members 71 having a male threaded end 72 that screws into a receiving hole 74 in the sensor body 63. The standoff member 71 has an enlarged head 76 that extends away from the sensor body 63. The head 76 has a threaded hole 78 that faces away from the sensor body 63 toward the cover 68.

The cover 68 has a receptacle 80 that partially receives the head 76 of the standoff member 71. The receptacle 80 includes a hole 82 aligned with the threaded hole 78 in the head 76. A bolt 84 or other fastener extends through the hole 82 in the cover 68 and screws into the head 76 to capture the cover between the standard off member and the bolt. In one embodiment, a rubber grommet and a washer are also sandwiched between the bolt 84 and the cover 68. The rubber grommet provides a flexible joint between the cover 68 and the load sensor to prevent the cover from exerting forces on the sensor that could cause inaccurate readings. Accordingly, the cover 68 doesn't restrict motion of the load sensor.

The standoff member 71 of the illustrated embodiment holds the cover 68 adjacent to the load sensor 64 and the equalizing beam 20, but the cover does not engage the inboard sidewall 34 of the equalizing beam. Accordingly, the cover 68 does not effect the bending or flex pattern of the equalizing beam 20. The cover 68 also has a cable slot 88 through which the signal cable 65 extends. Accordingly, the cover 68 can be securely retained immediately adjacent to the equalizing beam and support the signal cable 65 extending from the sensor body 63. In one embodiment, the cover 68 is a durable, rigid material, such as molded plastic. The cover 68 can be transparent or translucent to allow for visual inspection of the load sensor 64 through the cover. In an alternate embodiment, the cover 68 can be an opaque material. In other embodiments, other materials can be used for the cover 68.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A suspension and weigh system for use with a vehicle having axles, comprising:
a support beam connectable to the axles of the vehicle, the support beam being an equalizing beam having at least one of a boxed beam construction and a fabricated beam construction, the equalizing beam having a sidewall with a length and a neutral axis along at least a portion of the length of the sidewall; and
a weigh system coupled to the support beam and configured to measure and/or determine weight carried by the axles, the weigh system comprising
a load sensor mounted on the sidewall of the equalizing beam and positioned along the neutral axis to detect a deflection in the support beam in a plane substantially parallel to the sidewall and to provide an output signal related to at least one of the deflection and the weight; and
a data processor coupled to the load sensor and configured to receive the output signal from the load sensor for determining the weight carried by the axles.

2. The system of claim 1 wherein the support beam has forward and rear ends, and the load sensor is attached to the support beam closer to the forward end than to the rear end.

3. The system of claim 1, further comprising a display unit coupled to the data processor and configured to display data related to the weight carried by the axles.

4. The system of claim 1 wherein the support beam is a first support beam and the load sensor is a first load sensor, the system further comprising a second support beam spaced apart from the first support beam and having a second neutral axis, and a second load sensor attached to the second support beam and positioned substantially adjacent to the second neutral axis to detect a deflection in the second support beam and to provide a second output signal related to at least one of the deflection and the weight.

5. The system of claim 1, further comprising mounting members attached to the support beam generally adjacent to the neutral axis, and the load sensor is attached to the mounting members in alignment with the neutral axis.

6. The system of claim 1 wherein the load sensor includes one or more strain gauges in alignment with the neutral axis and positioned to be subjected to forces when bending loads are applied to the support beam.

7. The system of claim 1, further comprising a protective cover at least partially covering the load sensor.

8. The system of claim 1, further comprising a protective cover at least partially covering the load sensor, the protective cover being out of direct engagement with the support beam.

9. A suspension and weigh system for use with a vehicle having weight bearing members, comprising,
a support connectable to the weight bearing members of the vehicle, the support having a sidewall with a length and a neutral axis along at least a portion of the length; and
a weigh system coupled to the support and configured to measure and/or determine weight carried by the weight bearing members, the weigh system comprising
a load sensor mounted to the sidewall of the support and positioned along the neutral axis to detect a deflection in the support in a direction substantially parallel to the sidewall and to provide an output signal related to at least one of the deflection and the weight; and
a data processor coupled to the load sensor and configured to receive the output signal from the load sensor for determining the weight carried by the axles.

10. The system of claim 9 wherein the support is an equalizing beam.

11. The system of claim 9 wherein the support has at least one of a boxed beam construction and a fabricated beam construction.

12. The system of claim 9, further comprising a display unit coupled to the data processor and configured to display data related to the weight carried by the axles.

13. The system of claim 9 wherein the support is a first support and the load sensor is a first load sensor, the system further comprising a second support spaced apart from the first support and having a second neutral axis, and a second load sensor attached to the second support and positioned substantially adjacent to the second neutral axis to detect a deflection in the second support and to provide a second output signal related to at least one of the deflection and the weight.

14. The system of claim 9, further comprising mounting members attached to the support generally adjacent to the neutral axis, and the load sensor is attached to the mounting members in alignment with the neutral axis.

15. The system of claim 9 wherein the load sensor includes one or more strain gauges in alignment with the neutral axis and positioned to be subjected to forces when bending loads are applied to the support.

16. The system of claim 9, further comprising a protective cover at least partially covering the load sensor.

17. The system of claim 9, further comprising a protective cover at least partially covering the load sensor, the protective cover being out of direct engagement with the support.

* * * * *